United States Patent
Sakamoto

(10) Patent No.: US 6,332,036 B1
(45) Date of Patent: Dec. 18, 2001

(54) COLOR EXTRACTION APPARATUS AND METHOD

(75) Inventor: Takayuki Sakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/140,137

(22) Filed: Aug. 25, 1998

(30) Foreign Application Priority Data

Aug. 29, 1997 (JP) .............................................. PO9-235285

(51) Int. Cl.[7] .................................................. G06K 9/00
(52) U.S. Cl. .......................................... 382/162; 382/165
(58) Field of Search .................................... 382/162, 163, 382/165, 153, 164; 348/582, 587, 592, 631, 663, 29, 30, 125, 129, 135, 586, 590

(56) References Cited

U.S. PATENT DOCUMENTS

| | | | |
|---|---|---|---|
| 4,991,223 | * | 2/1991 | Bradley ................................. 348/592 |
| 5,087,965 | * | 2/1992 | Torre-Bueno ......................... 348/592 |
| 5,227,871 | * | 7/1993 | Funada et al. ........................ 358/518 |
| 5,313,275 | * | 5/1994 | Daly et al. ............................ 348/592 |
| 5,917,938 | * | 6/1999 | Funada et al. ........................ 382/165 |
| 6,011,595 | * | 1/2000 | Henderson et al. .................. 348/590 |
| 6,047,085 | * | 4/2000 | Sato et al. ............................. 382/165 |

* cited by examiner

Primary Examiner—Phuoc Tran
(74) Attorney, Agent, or Firm—Bell, Boyd & Lloyd LLC

(57) ABSTRACT

A Central Processing Unit sets in advance plural kinds of color models in tables of a color tables management block. An area signal indicating reference color areas for the respective colors is produced from the color tables management block by searching the tables for the signal level of a luminance signal that is obtained from an input color image signal. A color area comparison block judges whether the color of the input color image signal belongs to the reference color areas by comparing the area signal with the signal levels of chrominance signals that are obtained from the input color image signal. Resulting color extraction results for the input color image signal are combined for each position in the image and stored as unit data.

4 Claims, 6 Drawing Sheets

COLOR EXTRACTION APPARATUS AND METHOD

BACKGROUND OF THE INVENTION

1. Field of the Invention

The present invention relates to a color extraction apparatus and method for extracting a particular color from an input color image signal. For example, the invention is applied to realizing, in an entertainment robot or an imaging system, a function of recognizing a target object having a particular color and following it automatically.

2. Description of the Related Art

As disclosed in, for instance, Japanese Unexamined Patent Publication No. Hei. 8-51564, in conventional target following apparatuses and the like in which the imaging direction is controlled by detecting the movement of a target from an image taken by a television camera, it is operated to follow a target by using color information of a color image signal in addition to shape information of a target.

As proposed in Japanese Patent Application Nos. Sho. 59-12481 and Hei. 5-329272, a color extraction technique is known in which a color is extracted by normalizing input chrominance signals by an input luminance signal and comparing normalized signals with a preset value.

However, this conventional color extraction technique including normalization has a limitation that color models in a luminance/chrominance space are restricted.

The assignee of the present application has proposed a technique in which a high-order color model is introduced and a judgment is made by calculating the distance between a model and an input image with a microcomputer (Japanese Patent Application No. Hei. 9-48786). However, in this type of technique in which limitations on models are eliminated by using a microcomputer, the execution speed and the capability of accommodating a plurality of colors are insufficient because an input image is processed by the microcomputer.

SUMMARY OF THE INVENTION

An object of the present invention is to provide a color extraction apparatus and method which can not only reduce the load of a signal processing means for image processing but also increase the extendability of a color model to thereby enable high-speed, simultaneous extraction of multiple colors by using a more flexible model.

The invention provides a color extraction apparatus comprising input signal processing means for obtaining a luminance signal and chrominance signals from an input image signal; color table managing means for producing, as a reference, a signal indicating a color area by searching a preset table based on a signal level of the luminance signal; color area comparing means for judging whether a color of the input image signal belongs to the reference color area by comparing the signal indicating the reference color area with signal levels of the chrominance signals; storing means for accumulating a color extraction result for the input image signal that is obtained as a comparison output of the color area comparing means; and control means for setting in advance the table corresponding to signal levels of the luminance signal in the color table managing means.

The above color extraction apparatus may be configured in such a manner that the control means sets a plurality of color models in tables of the color table managing means; the color table managing means produces, as references, signals indicating color areas for the respective color models by searching the tables in which the plurality of color models are set based on the signal level of the luminance signal; the color area comparing means judges whether the color of the input image signal belongs to the reference color areas by comparing the signals indicating the reference color areas with the signal levels of the chrominance signals; and the storing means accumulates color extraction results for the input image signal that are obtained as comparison outputs of the color area comparing means, the color extraction results being combined as unit data for each position in an image.

The above color extraction apparatus may further comprise means for calculating, for each of the color models, the number of color extraction results indicating that the color of the input image signal belongs to the reference color area; and means for calculating, for each of the color models, positional information and distribution information of in the image based on the number of color extraction results indicating that the color of the input image signal belongs to the reference color area and positions of those color extraction results in the image, wherein the storing means may store calculation results independently for the respective color models.

The above color extraction apparatus may further comprise logic operation means for performing a logic operation on color extraction results for a plurality of color models indicating that the color of the input image signal belongs to the reference color area, the color extraction results being obtained at a certain position in the image; and means for setting the logical operation, wherein the storing means may store operation results of the logical operation means independently for the respective color models.

The invention also provides a color extraction method comprising the steps of storing a color model of an extraction object; reading out an area of the stored color model based on a luminance signal level of an input image signal; comparing a signal indicating the read-out area with chrominance signal levels of the input image signal; and accumulating a comparison result as a color extraction result.

The above color extraction method may be such that the storing step sets a plurality of color models in tables; the reading step produces, as references, signals indicating color areas for the respective color models by searching the tables in which the plurality of color models are set based on the luminance signal level of the input image signal; and the comparing step judges whether a color of the input image signal belongs to the reference color areas by comparing the signals indicating the reference color areas with the chrominance signal levels of the input image signal, whereby color extraction is performed on the input image signal.

According to the invention, color extraction can be performed at high speed according to a color model that represents a particular distribution in a color difference space. At the same time, such information as size and position of an extracted color region can also be detected. Extended application to circuits in which detections are simultaneously performed for multiple color models can be done easily. Further, models can be set freely and can be extended by introducing a new operation such as combining models.

Therefore, in the color extraction apparatus and method according to the present invention, color extraction can be performed at high speed for multiple colors by using flexible models and, at the same time, such information as areas and centers of gravity for the respective colors in an image can also be extracted. This makes it possible to reduce the load of a CPU relating to a pre-process for image recognition.

DETAILED DESCRIPTION OF THE PREFERRED EMBODIMENT

An embodiment of the present invention will be hereinafter described in detail with reference to the accompanying drawings.

Figure 1:
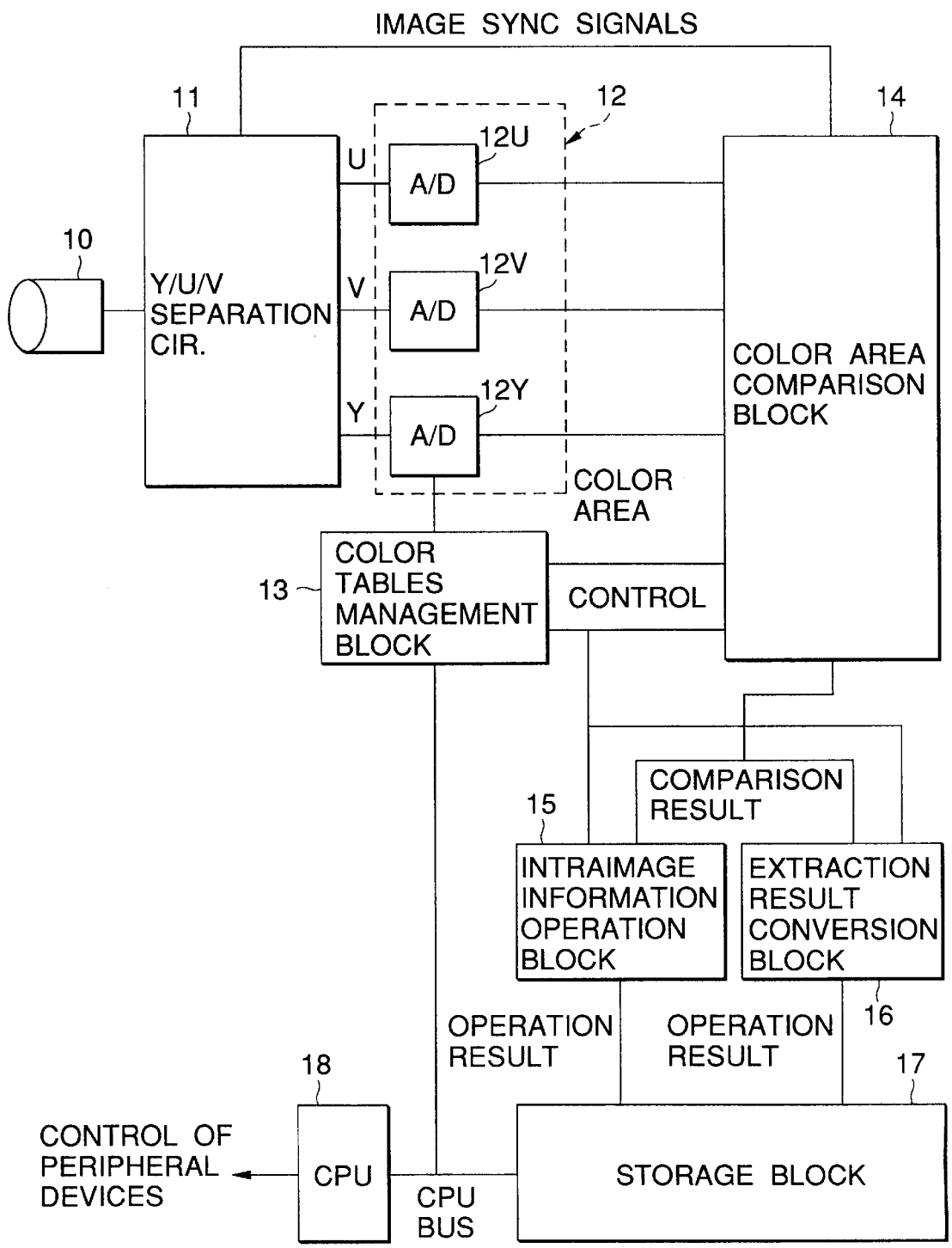
FIG. 1 is a block diagram showing the configuration of a color extraction apparatus according to the present invention.

For example, a color extraction apparatus according to the invention is configured as shown in FIG. 1. This color extraction apparatus is applied to an entertainment robot which changes its action in accordance with a color of an object. The color extraction apparatus is composed of a color video camera 10, a Y/U/V signals separation circuit 11, an A/D conversion block 12, color tables management block 13, a color area comparison block 14, an intraimage information operation block 15, an extraction result conversion block 16, a storage block 17, and a central processing unit (CPU) 18, and performs color extraction for eight colors that are specified by the CPU 18 that determines the action of the robot.

In this color extraction apparatus, color video camera 10, which corresponds to the eyes of the robot, supplies the Y/U/V signals separation circuit 11 with an input color image signal that is obtained by photographing an object.

The Y/U/V signals separation circuit 11 separates the input color image signal that has been obtained by color video camera 10 into a luminance signal and chrominance signals, and supplies those signals to the A/D conversion block 12.

The A/D conversion block 12 digitizes the luminance signal Y and the chrominance signals U and V that have been separated by the Y/U/V signals separation circuit 11 with three respective A/D converters 12Y, 12U, and 12V, and thereby outputs luminance level data (hereinafter referred to as an input luminance signal Y) indicating a signal level Y of the luminance signal and chrominance level data (hereinafter referred to as input chrominance signals U and V) indicating signal levels U and V of the respective chrominance signals.

The input luminance signal Y that has been obtained by digitizing the luminance signal by the A/D converter 12Y of the A/D conversion block 12 is supplied to color tables management block 13 and color area comparison block 14. The input chrominance signals U and V that have been obtained by digitizing the chrominance signals U and V by the A/D converters 12U and 12V, respectively, are supplied to color area comparison block 14.

The color tables management block 13 searches tables based on the input luminance signal Y that is supplied from the A/D converter 12Y, and thereby outputs, to the color area comparison block 14, an area signal indicating reference color areas that are assumed for the eight colors when the input luminance signal Y is input.

The color area comparison block 14 compares the area signal indicating the reference color areas that is supplied from color tables management block 13 with the input chrominance signals U and V that are supplied from the respective A/D converters 12U and 12V, and outputs resulting comparison results for the respective colors to intra-image information operation block 15 and extraction result conversion block 16.

The intra-image information operation block 15 calculates areas and centers of gravity based on the comparison results of color area comparison block 14 and positions in the image. The extraction result conversion block 16 combines together the eight comparison results of color area comparison block 14 and converts the extraction results for the eight colors into byte data for each position in the image.

The storage block 17 stores operation results of intra-image information operation block 15 and a conversion result of extraction result conversion block 16.

The CPU 18 determines the action of the robot based on the data stored in storage block 17 and controls the various peripheral devices.

Now, specific configurations and operations of color tables management block 13, color area comparison block 14, intra-image information operation block 15, and extraction result conversion block 16 in the color extraction apparatus will be described.

Figure 2:
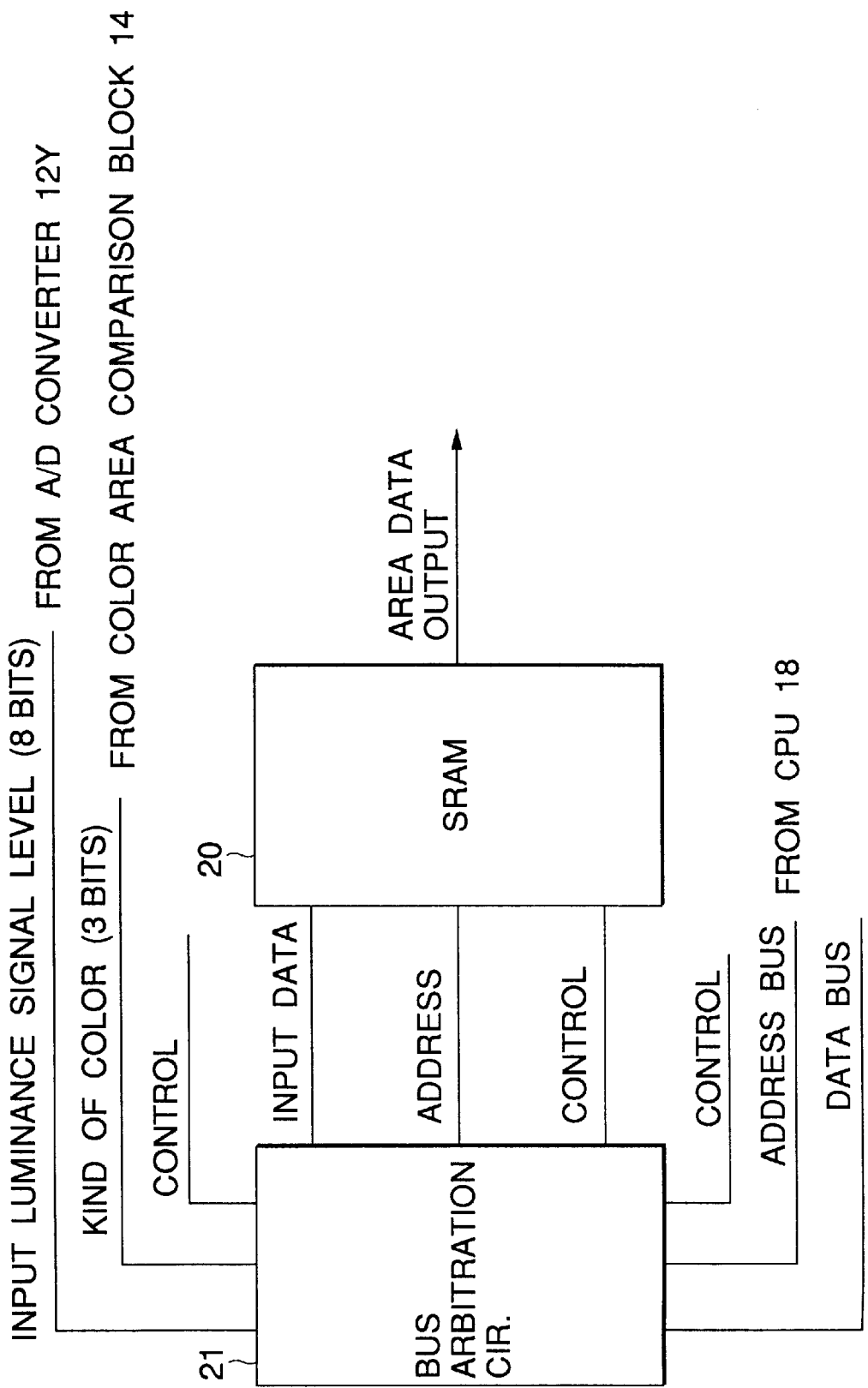
FIG. 2 is a block diagram showing an example of a specific configuration of a color tables management block in the color extraction apparatus of FIG. 1.

FIG. 2 shows a specific configuration of the color tables management block 13. As shown in FIG. 2, the color tables management block 13 is composed of a static random access memory (SRAM) 20 and a bus arbitration circuit 21.

The SRAM 20 stores color area tables. In this embodiment, SRAM 20 has a storage capacity of 8 Kbytes so as to be able to store eight kinds of tables in a case where the data bus width of CPU 18 is 32 bits and an input luminance signal Y is of 8 bits. The bus arbitration circuit 21 arbitrates between writing from the CPU 18 to the tables on the SRAM 20 and inquiry from color area comparison block 14 to the tables on SRAM 20.

The SRAM 20 has logical gaps at every 256 addresses. The SRAM 20 receives an address of 11 bits that consists of an input luminance signal Y (8 bits) and a color designation signal (3 bits) indicating the kind of color that is supplied from color area comparison block 14.

Color areas to be stored in SRAM 20 will be described below with reference to FIGS. 3 and 4.

Figure 3:
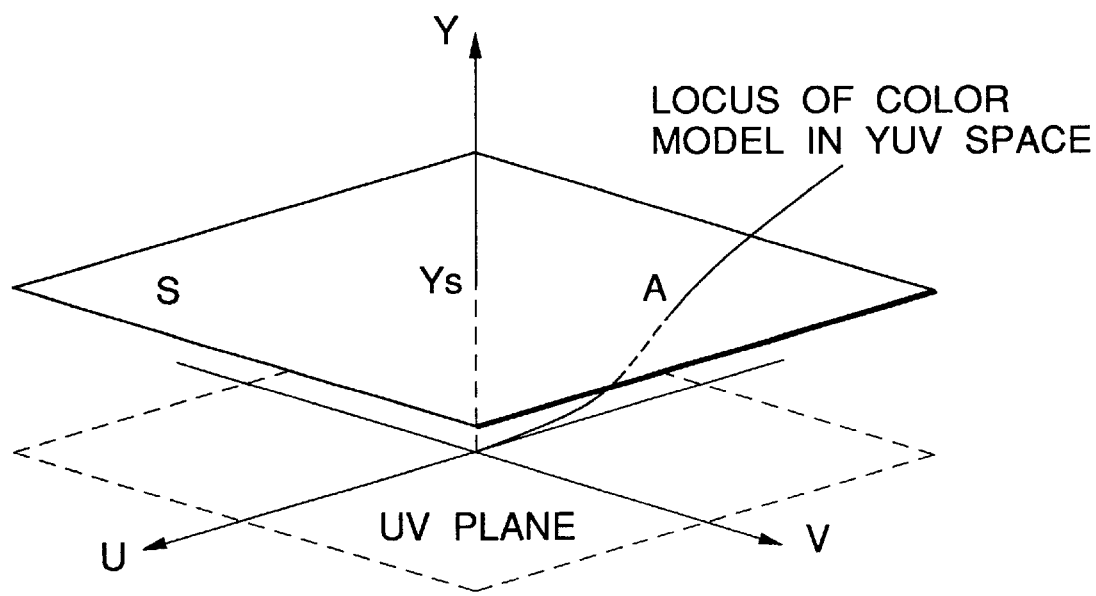
FIG. 3 is a diagram showing a locus in the (Y, U, V) space in a case where a model that the signal levels of chrominance signals U and V monotonically increase in proportion to the signal level of a luminance signal Y.

FIG. 3 shows a locus in the (Y, U, V) space in a case where a model that the signal levels of the chrominance signals U and V increase monotonically in proportion to the signal level of the luminance signal Y is assumed. FIG. 4 is a diagram obtained by cutting the model of FIG. 3 by plane S that is parallel with the U-V plane and has intercept Ys (Y coordinate).

Figure 4:
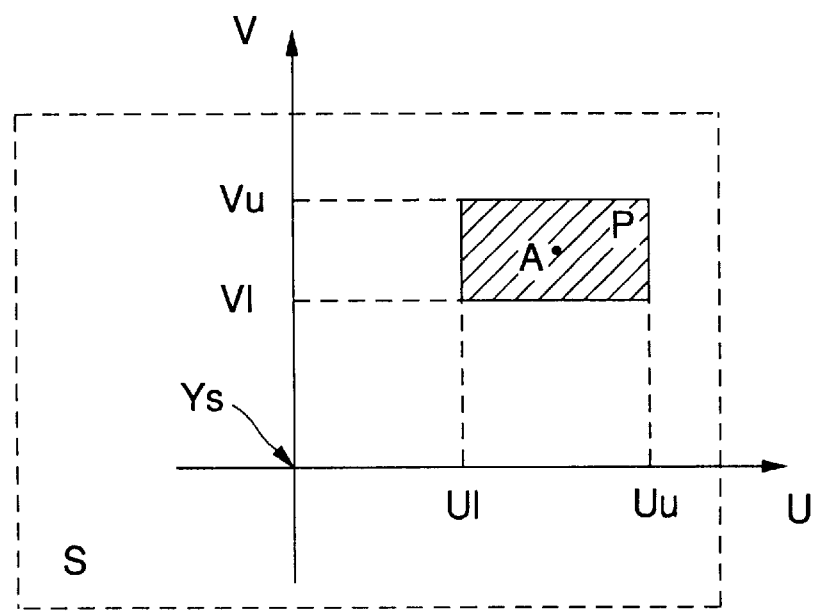
FIG. 4 is a diagram obtained by cutting the color space model of FIG. 3 by plane S that is parallel with the UV plane and has intercept YS.

Point A shown in FIG. 4 is the same as that shown in FIG. 3. Points (Uh, Ul, Vh, Vl) representing a rectangular area P where the color may be judged to be the same as the color of the model concerned are expressed by data of 32 bits.

In this manner, a set of points representing a rectangular area for each level of the luminance signal Y is stored in SRAM 20 as a color area. Color model setting is completed by preparing tables for eight colors in similar manners.

Figure 5:
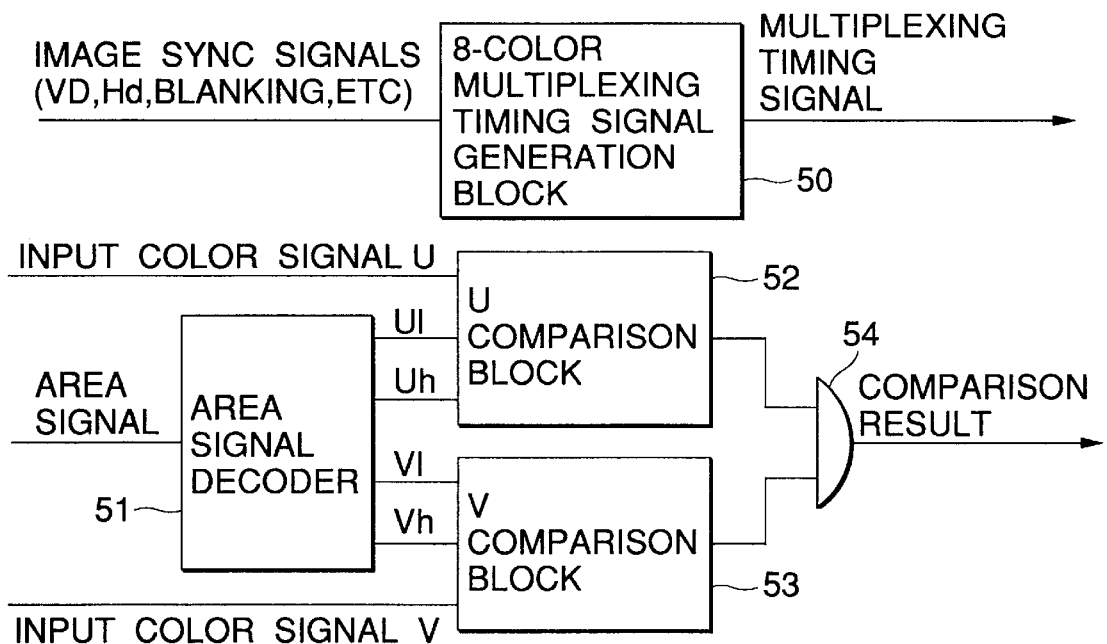
FIG. 5 is a block diagram showing an example of a specific configuration of a color area comparison block in the color extraction apparatus of FIG. 1.

As shown in FIG. 5, the color area comparison block 14 is composed of an 8-color multiplexing timing signal generation block 50, an area signal decoder 51, a U comparison block 52, a V comparison block 53, and an AND circuit 54. In this specific example of color area comparison block 14, a clock signal is provided whose frequency is eight times or more higher than the image sampling frequency, and detection for eight colors is performed by repeating the same kind of process eight times.

In this specific example of the color area comparison block 14, 8-color multiplexing timing signal generation block 50 is a bit counter circuit of 3 bits, and generates a timing signal as a basis of 8-color multiplexed extraction by increasing the count from 0 to 7 until the input of the next pixel. Data of 11 bits that is a combination of a 3-bit output of the 8-color multiplexing timing signal generation block 50 and 8-bit data indicating the signal level of an input luminance signal Y becomes an address for reading from the tables on SRAM 20 of color tables management block 13.

The area signal decoder 51 divides 32-bit data indicating a rectangular area (reference color area) that has been output from the color tables management block 13 in accordance with an address into upper and lower limit values Uh and Ul for the chrominance signal U and upper and lower limit values Vh and Vl for the chrominance signal V.

The U comparison block 52 compares an input chrominance signal U with the upper and lower limit values Uh and Ul for the chrominance signal U that are supplied from area signal decoder 51, and outputs a comparison result indicating whether the input chrominance signal U is between the upper and lower limit values Uh and Ul for the chrominance signal U. A V comparison block 53 compares an input chrominance signal V with the upper and lower limit values Vh and Vl for the chrominance signal V that are supplied from area signal decoder 51, and outputs a comparison result indicating whether the input chrominance signal V is between the upper and lower limit values Vh and Vl for the chrominance signal V.

The AND circuit 54 perform an AND operation the comparison results of the U comparison block 52 and the V comparison block 53.

In color area comparison block 14, the AND output of AND circuit 54 provides an extraction result at the current position in the image for one of the registered color models (determined by the 3-bit timing signal). Extraction results for the eight colors can be obtained for each pixel by repeating the above process in link with the count-up operation of the counter circuit that constitutes 8-color multiplexing timing signal generation block 50.

As a result of the above process, it is judged which of the eight registered colors the color of one position in the image corresponds to.

Figure 6:
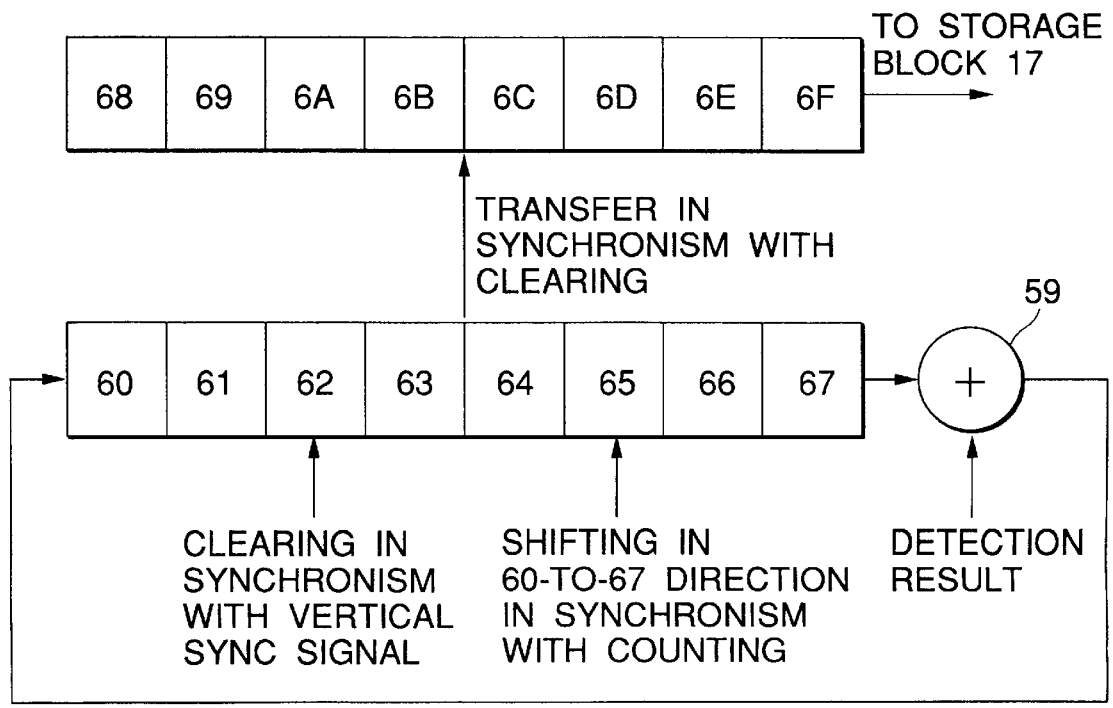
FIG. 6 is a block diagram showing an example of a specific configuration of an intra-image information operation block in the color extraction apparatus of FIG. 1.

As shown in FIG. 6, intra-image information operation block 15 is composed of registers 60–6F and an adder 59.

The registers 60–67 store areas of the respective colors and are cleared in synchronism with a vertical sync signal. In registers 60–67, data are shifted in synchronism with the count-up operation of the counter circuit that constitutes the 8-color multiplexing timing signal generation block 50. An operation that the adder 59 adds a comparison result to data that is stored in the register 67 at a time point of some count value and an addition result is returned to register 60 is repeated until the arrival of the next vertical sync signal. Data of the respective registers 60–67 are transferred to the registers 68–6F at a time point when they are cleared. As a result, calculation results of areas of the respective colors in the image are obtained in registers 68–6F. The calculation results obtained in registers 68–6F are transferred to the storage block 17.

Centers of gravity are calculated in the following manner. A center of gravity of each color can be calculated by dividing a horizontal position at a time of color coincidence by an added area and dividing a vertical position at a time of color coincidence by an added area, by using circuits similar to the circuit of FIG. 6.

The intra-image information operation block 15 calculates areas and centers of gravity in the above manner based on the comparison results of the color area comparison block 14 and the positions in the image, and transfers those calculation results to the storage block 17.

Figure 7:
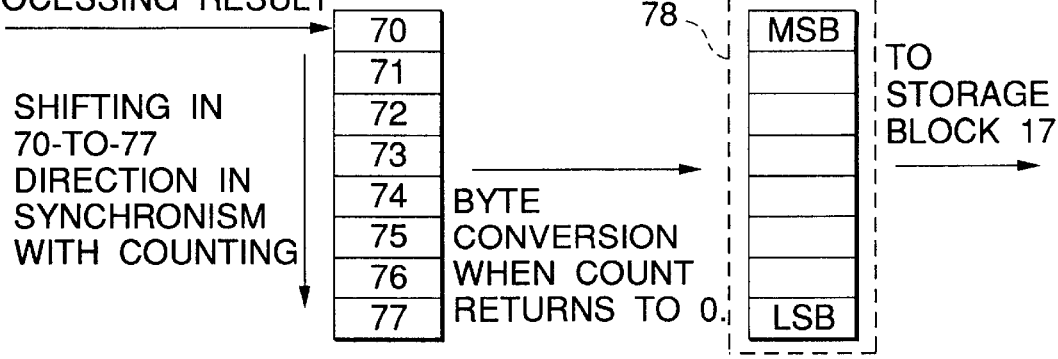
FIG. 7 is a block diagram showing an example of a specific configuration of an extraction result conversion block in the color extraction apparatus of FIG. 1.

As shown in FIG. 7, the extraction result conversion block 16 is composed of bit registers 70–77 and a byte register 78.

In bit registers 70–77 of the extraction result conversion block 16, a comparison result, that is, a color extraction processing result, of the color area comparison block 14 is input to bit register 70 as 1-bit data. This data is shifted toward bit register 77 in synchronism with the count-up operation of the counter circuit that constitutes 8-color multiplexing timing signal generation block 50. Data stored in the respective bit registers 70–77 are transferred, as 8-bit data, to 8-bit register 78 at a time point when the count of the counter circuit returns from 7 to 0. The 8-bit data obtained in 8-bit register 78 is transferred to storage block 17.

That is, extraction result conversion block 16 converts, into 8-bit data, 1-bit data indicating color extraction processing results that have been obtained as comparison results by color area comparison block 14, and transfers the 8-bit data to storage block 17 as data of a kind of multi-valued image.

By referring to the above processing results, CPU 18 determines the action of the entertainment robot, for instance, it should be moved closer to or away from an object having a particular color.

Figure 8:
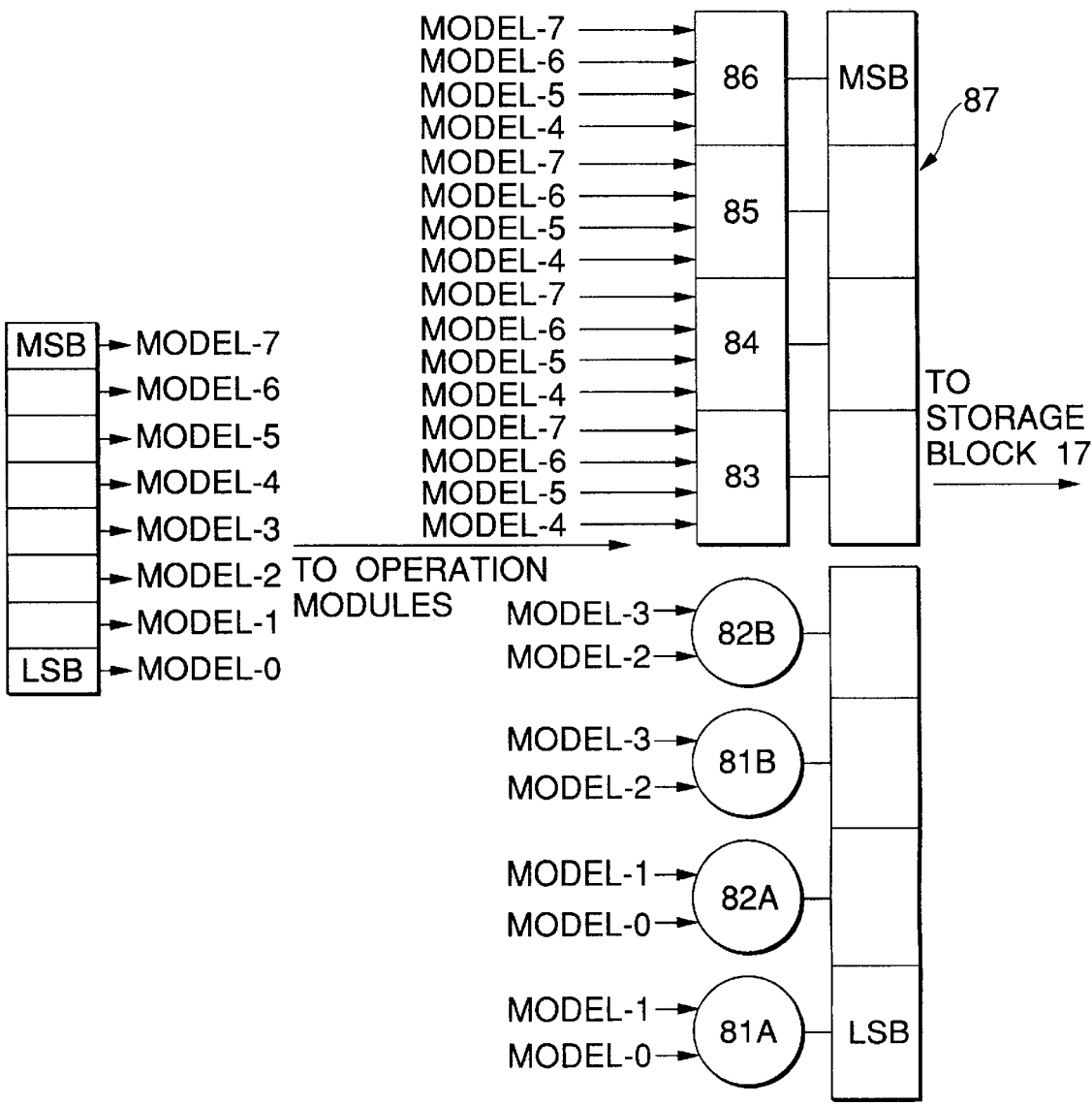
FIG. 8 is a block diagram showing an example of a specific configuration of a logical operation block that may be additionally provided in the color extraction apparatus of FIG. 1.

The color extraction apparatus according to the invention may be configured in such a manner that 8-bit data indicating color extraction results for color model-0 to color model-7 that correspond to the eight colors is produced by extraction result conversion block 16 and then transferred to storage block 17 via, for instance, a logical operation block 19 as shown in FIG. 8.

The logical operation block 19 shown in FIG. 8, which performs operations on results for color models that are represented by table numbers, is composed of 2-bit operation modules 81A, 81B, 82A, and 82B, 4-bit operation modules 83–86, and an 8-bit register 87.

The 2-bit operation module 81A performs a transposition operation on a result for color model-0 that is set in table No. 0 and a result for color model-1 that is set in table No. 1. The 2-bit operation module 82A performs a transposition operation on an inverted result for color model-0 and the result for color model-1. Similarly, the 2-bit operation module 81B performs a transposition operation on results for color model-2 and color model-3. The 2-bit operation module 82B performs a transposition operation on an inverted result for color model-2 and the result for color model-3.

Figure 9:
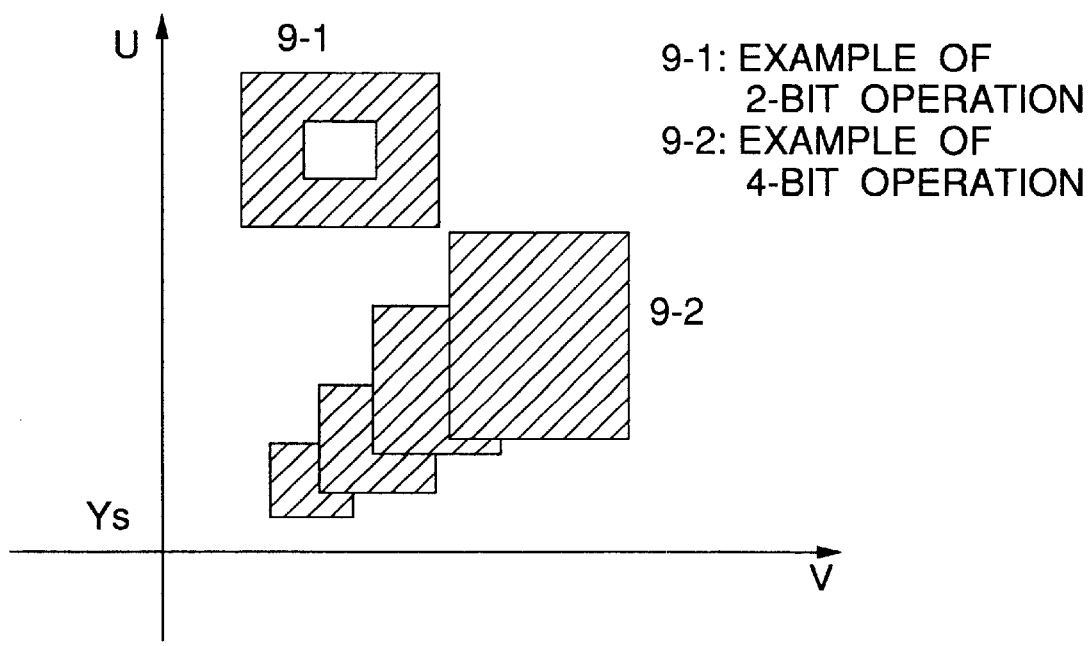
FIG. 9 is a diagram showing examples of areas at some luminance signal level of new, extended models that are obtained by additionally providing the logical operation block in the color extraction apparatus of FIG. 1.

By performing 2-input logical operations on color extraction results of respective color models as performed by the 2-bit operation modules 81A, 81B, 82A, and 82B, an annular area 9-1 shown in FIG. 9, for instance, can be used as a new model.

Each of the 4-bit operation modules 83–86 performs a 4-input logical operation on color extraction results for color model-4 to color model-7. For example, this enables setting of a new model 9-2 shown in FIG. 9.

If the order of tables for the eight basic color models on SRAM 13 is changed properly, selection circuits at the input portions of the respective operations can be omitted.

As described above, by additionally providing a simple logical operation circuit, the color models can be extended easily.

The color extraction apparatus according to the invention can provide functions other than the color extraction. For example, a histogram of the chrominance signal U can be calculated by setting a table common to the entire luminance signal which table includes the entire chrominance signal V for a particular section of the chrominance signal U and using an area calculation circuit. Similarly, it is possible to calculate a histogram of the chrominance signal V or the luminance signal Y.

A higher-level model can be introduced by using a programmable operation device as a logical operation block instead of the above logical operation block 19 which performs the fixed logical operation.

Although the above embodiment is directed to the case of using the eight color models, it is possible to increase the number of models in the same manner as in the above embodiment, or to compare data for multiple colors simultaneously by using parallel circuits rather than in a time-multiplexed manner.

The same advantages can be obtained even if the color models are stored in a ROM rather than a RAM.

What is claimed is:

1. An apparatus for extracting color from an image signal, comprising:

input signal processing means for obtaining a luminance signal and chrominance signals from an input image signal;

color table managing means for producing, as a reference, a signal indicating a color area by searching a preset table based on a signal level of the luminance signal;

control means for setting in advance tables corresponding to signal levels of the luminance signal in the color table managing means;

color area comparing means for judging whether a color of the input image signal belongs to the reference color area by comparing the signal indicating the reference color area with signal levels of the chrominance signals; and storing means for accumulating a color extraction result for the input image signal that is obtained as a comparison output of the color area comparing means;

means for calculating, for each of the color models, the number of color extraction results indicating that the color of the input image signal belongs to the reference color area; and means for calculating, for each of the color models, positional information and distribution information of in the image based on the number of color extraction results indicating that the color of the input image signal belongs to the reference color area and positions of those color extraction results in the image, wherein the storing means stores calculation results independently for the respective color models;

wherein the control means sets a plurality of color models in tables of the color table managing means;

wherein the color table managing means produces, as references, signals indicating color areas for the respective color models by searching the tables in which the plurality of color models are set based on the signal level of the luminance signal;

wherein the color area comparing means judges whether the color of the input image signal belongs to the reference color areas by comparing the signals indicating the reference color areas with the signal levels of the chrominance signals; and further wherein the storing means accumulates color extraction results for the input image signal that are obtained as comparison outputs of the color area comparing means, the color extraction results being combined as unit data for each position in an image.

2. An apparatus for extracting color from an image signal, comprising:

input signal processing means for obtaining a luminance signal and chrominance signals from an input image signal;

color table managing means for producing, as a reference, a signal indicating a color area by searching a preset table based on a signal level of the luminance signal;

control means for setting in advance tables corresponding to signal levels of the luminance signal in the color table managing means;

color area comparing means for judging whether a color of the input image signal belongs to the reference color area by comparing the signal indicating the reference color area with signal levels of the chrominance signals; and storing means for accumulating a color extraction result for the input image signal that is obtained as a comparison output of the color area comparing means;

logical operation means for performing a logical operation on color extraction results for a plurality of color models indicating that the color of the input image signal belongs to the reference color area, the color extraction results being obtained at a certain position in the image; and means for setting the logical operation, wherein the storing means stores operation results of the logical operation means independently for the respective color models;

wherein the control means sets a plurality of color models in tables of the color table managing means;

wherein the color table managing means produces, as references, signals indicating color areas for the respective color models by searching the tables in which the plurality of color models are set based on the signal level of the luminance signal;

wherein the color area comparing means judges whether the color of the input image signal belongs to the reference color areas by comparing the signals indicating the reference color areas with the signal levels of the chrominance signals; and further wherein the storing means accumulates color extraction results for the input image signal that are obtained as comparison outputs of the color area comparing means, the color extraction results being combined as unit data for each position in an image.

3. A method of extracting color from an image signal, comprising the steps of:

obtaining a luminance signal and chrominance signals from an input image signal;

producing, as a reference, a signal indicating a color area by searching a preset table based on a signal level of the luminance signal;

setting in advance tables corresponding to signal levels of the luminance signal in the producing step;

judging whether a color of the input image signal belongs to the reference color area by comparing the signal indicating the reference color area with signal levels of the chrominance signals; and accumulating a color extraction result for the input image signal that is obtained as a comparison output of the judging step;

calculating, for each of the color models, the number of color extraction results indicating that the color of the input image signal belongs to the reference color area; and calculating, for each of the color models, positional information and distribution information of in the image based on the number of color extraction results indicating that the color of the input image signal belongs to the reference color area and positions of those color extraction results in the image, wherein the accumulating step stores calculation results independently for the respective color models;

wherein the controlling step sets a plurality of color models in tables at said producing step;

wherein the producing step produces, as references, signals indicating color areas for the respective color models by searching the tables in which the plurality of color models are set based on the signal level of the luminance signal;

wherein the judging step judges whether the color of the input image signal belongs to the reference color areas by comparing the signals indicating the reference color areas with the signal levels of the chrominance signals; and further wherein the accumulating step accumulates color extraction results for the input image signal that are obtained as comparison outputs of the judging step, the color extraction results being combined as unit data for each position in an image.

4. A method for extracting color from an image signal, comprising the step of:

obtaining a luminance signal and chrominance signals from an input image signal;

producing, as a reference, a signal indicating a color area by searching a preset table based on a signal level of the luminance signal;

setting in advance tables corresponding to signal levels of the luminance signal in the producing step;

judging whether a color of the input image signal belongs to the reference color area by comparing the signal indicating the reference color area with signal levels of the chrominance signals; and accumulating a color extraction result for the input image signal that is obtained as a comparison output of the judging step;

performing a logical operation on color extraction results for a plurality of color models indicating that the color of the input image signal belongs to the reference color area, the color extraction results being obtained at a certain position in the image; and setting the logical operation, wherein the accumulating step stores operation results of the logical operation performing step independently for the respective color models;

wherein the step of setting in advance tables corresponding to signal levels of the luminance signal sets a plurality of color models in tables of said producing step;

wherein the producing step produces, as references, signals indicating color areas for the respective color models by searching the tables in which the plurality of color models are set based on the signal level of the luminance signal;

wherein the judging step judges whether the color of the input image signal belongs to the reference color areas by comparing the signals indicating the reference color areas with the signal levels of the chrominance signals; and further wherein the accumulating step accumulates color extraction results for the input image signal that are obtained as comparison outputs of the judging step, the color extraction results being combined as unit data for each position in an image.

* * * * *